(12) United States Patent
Kim et al.

(10) Patent No.: US 7,298,610 B2
(45) Date of Patent: Nov. 20, 2007

(54) SUPPORTING APPARATUS FOR PORTABLE COMPUTER

(75) Inventors: Hyoung-Min Kim, Osan (KR); Yun-Tae Kim, Pyongtaek (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/901,198

(22) Filed: Jul. 29, 2004

(65) Prior Publication Data

US 2005/0057894 A1    Mar. 17, 2005

(30) Foreign Application Priority Data

Aug. 1, 2003    (KR) .............. 10-2003-0053540
Aug. 8, 2003    (KR) .............. 10-2003-0054954

(51) Int. Cl.
*H05K 5/00*    (2006.01)
*H05K 7/00*    (2006.01)

(52) U.S. Cl. ............ 361/683; 361/680; 361/681; 248/918

(58) Field of Classification Search ........ 361/679, 361/680, 681, 682, 683, 724, 725, 727
See application file for complete search history.

(56) References Cited

U.S. PATENT DOCUMENTS

| | | | |
|---|---|---|---|
| 4,571,456 A * | 2/1986 | Paulsen et al. ............ 379/457 |
| 4,951,241 A * | 8/1990 | Hosoi et al. ............... 361/680 |
| 4,978,949 A * | 12/1990 | Herron et al. ............. 345/168 |
| 5,111,361 A * | 5/1992 | Kobayashi ................. 361/683 |
| 5,260,885 A * | 11/1993 | Ma ............................ 361/681 |
| 5,293,300 A | 3/1994 | Leung et al. |
| 5,375,076 A * | 12/1994 | Goodrich et al. .......... 361/681 |
| 5,469,327 A * | 11/1995 | Cheng ........................ 361/680 |
| 5,503,361 A * | 4/1996 | Kan-O et al. .............. 248/688 |
| 5,818,360 A * | 10/1998 | Chu et al. .................... 341/22 |
| 5,818,690 A * | 10/1998 | Spencer ...................... 361/680 |
| 5,900,846 A * | 5/1999 | Phelps et al. .............. 343/901 |
| 5,926,364 A * | 7/1999 | Karidis ...................... 361/681 |
| 5,954,156 A * | 9/1999 | Cooke ........................ 182/153 |
| 5,996,602 A * | 12/1999 | Cato, III .................... 135/75 |
| 6,016,248 A * | 1/2000 | Anzai et al. ............... 361/683 |
| 6,053,589 A * | 4/2000 | Lin ............................. 312/271 |
| 6,068,355 A * | 5/2000 | Thorp ........................ 312/241 |
| 6,091,600 A * | 7/2000 | Jeong ........................ 361/680 |
| 6,097,592 A | 8/2000 | Seo et al. |
| 6,108,200 A * | 8/2000 | Fullerton .................. 361/686 |
| 6,158,089 A * | 12/2000 | Monahan et al. .......... 16/429 |
| 6,191,938 B1 * | 2/2001 | Ohgami et al. ........... 361/681 |
| 6,191,940 B1 * | 2/2001 | Ma ............................ 361/681 |
| 6,198,624 B1 * | 3/2001 | Margaritis ................. 361/681 |
| 6,213,672 B1 * | 4/2001 | Varga ........................ 403/109.2 |
| 6,301,101 B1 | 10/2001 | Anzai et al. |
| 6,317,315 B1 * | 11/2001 | Lee et al. ................... 361/681 |
| 6,353,529 B1 | 3/2002 | Cies |
| 6,496,365 B2 * | 12/2002 | Tsai ........................... 361/686 |
| 6,807,050 B1 * | 10/2004 | Whitehorn et al. ....... 361/681 |
| 6,870,730 B2 * | 3/2005 | Riddiford ................. 361/681 |
| 6,952,340 B2 * | 10/2005 | Son et al. .................. 361/680 |

* cited by examiner

FOREIGN PATENT DOCUMENTS

CN    2414245 Y    1/2001

*Primary Examiner*—Lisa Lea-Edmonds
*Assistant Examiner*—Anthony Haughton
(74) *Attorney, Agent, or Firm*—Birch, Stewart, Kolasch & Birch, LLP

(57) ABSTRACT

A supporting apparatus for a portable computer is provided. The portable computer includes a base part and a pivoting part pivotally coupled to the base part. The apparatus includes a support structure projecting from side rear portions of the base part, so as to provide support for a pivoting of the pivoting part.

18 Claims, 19 Drawing Sheets

Related Art

SUPPORTING APPARATUS FOR PORTABLE COMPUTER

The present application claims, under 35 U.S.C. § 119, the priority benefit of Patent Application No. P2003-053540 filed on Aug. 1, 2003 in Republic of Korea; and Patent Application No. P2003-054954 filed on Aug. 8, 2003 in Republic of Korea. The entire contents of each of these applications are herein fully incorporated by reference.

BACKGROUND OF THE INVENTION

1. Field of Invention

The present invention relates to a portable computer, and more particularly, to a supporting apparatus of a portable computer for stably supporting an installation state of the portable computer in use.

2. Description of the Related Art

Examples of a portable computer, which is a computer adapted to be portable, are a notebook computer, a tablet computer, and the like. FIG. 1 shows a general notebook computer.

As shown in FIG. 1, in the notebook computer, a main body 1 and a display unit 3 are generally connected to each other through hinge portions 5, so that the display unit 3 can be folded onto the main body 1 for storage. The notebook computer is unfolded for use as shown in FIG. 1.

The main body 1 is formed in a generally flat plate shape. A main board and other various parts constituting the notebook computer are installed in the main body 1. The upper surface of the main body 1 is provided with a keyboard 7 as an input device. The display unit 3 is provided with a display 8.

When the display unit 3 is folded or unfolded with respect to the main body 1 through the hinge portions 5 in the notebook computer constituted as above, if an angle between the display 8 of the display unit 3 and the main body 1 becomes large, the center of gravity of the notebook computer moves toward the display unit 3, so that the main body 1 may be raised, rendering the use of the computer difficult. In order to prevent the raising of the main body 1, then the weight and size of the main body 1 are increased.

In the meantime, as shown in FIG. 2, a tablet computer 10, which is integrally provided with a display 13, is used as a portable computer. Such a tablet computer 10 may be used in a state where a keyboard 15 is attached thereto. The tablet computer 10 is formed in a flat plate shape and the entire surface thereof is formed with the display 13. Since the display 13 has a touch screen function, data input can be made with a stylus pen.

The keyboard 15 is also formed in a flat plate shape having nearly the same area size as the main body 11. A plurality of keys 16 for inputting information are arranged on the keyboard 15. A swivel hinge 17 is provided at the rear end of the keyboard 15. The swivel hinge 17 is for rotating the tablet computer 10 with the keyboard 15 connected thereto.

The swivel hinge 17 is provided with a rotating plate 18. The rotating plate 18 is provided at the keyboard 15 and then rotates. In addition, the rotating plate 18 is provided with a connecting plate 19. A connecting bracket 20 is installed in the connecting plate 19, wherein the tablet computer 10 is mounted on the connecting bracket 20. The connecting bracket 20 is extended right and left from the connecting plate 19 at a predetermined length.

The connecting bracket 20 is provided with engaging hooks 22 for engagement with the tablet computer 10 at both sides of the connecting bracket 20. The connecting bracket 20 is also provided with a connector 21, which is used in electric connection for transmitting the information inputted through the keyboard 15 to the tablet computer 10. The connector 21 is connected to a connector, which is provided at a corresponding position of the tablet computer 10.

Since the tablet computer 10 is connected to the connecting bracket 20 of the keyboard 15, the tablet computer 10 can be folded and unfolded with respect to the keyboard 15 as a notebook computer and can be rotated about the swivel hinge 17 in use.

The above computers, however, have problems as follows.

First, in order for the notebook computer to maintain a stable installation state regardless of an unfolded angle of the display unit 3 with respect to the main body 1, there is the problem that the weight and size of the main body 1 need to be increased. But, this goes against providing a light and compact design. Such a problem is more serious in the tablet computer 10. The tablet computer 10 is provided with all the various parts constituting a computer as well as the display 13. Therefore, the tablet computer 10 is generally heavier than the main body 1 of the notebook computer, which causes the keyboard 15 to be raised significantly when the table computer 10 is unfolded.

In addition, when the keyboard 15 functions only as a keyboard, since the keyboard 15 does not have any parts other than the parts related to the keys 16, the keyboard 15 becomes relatively light. However, in such a case, the tablet computer 10 cannot be supported by the keyboard 15 when the tablet computer 10 is mounted to the keyboard 15, and the keyboard 15 will be raised. To address this problem, the keyboard 15 and the tablet computer 10 may have the same size, and if necessary, a weight can be added to the keyboard 15. But this results in a heavier and larger tablet computer and keyboard, which makes it difficult to carry and use the computer.

Unfortunately, in the portable computers according to the related art, the schemes for stabilizing the support structures are in fact obstacles to providing a light and compact portable computer.

SUMMARY OF THE INVENTION

Accordingly, the present invention is conceived to solve the aforementioned problems and other problems in the related art.

It is an object of the present invention to provide a supporting apparatus of a portable computer for stabilizing an installation state of the portable computer for its use.

It is another object of the present invention to provide a supporting apparatus of a portable computer, which is light and compact as well as stabilizes the installation state of the portable computer for its use.

It is a further object of the present invention to provide a supporting apparatus of a portable computer, which automatically acts to stabilize the installation state of the portable computer for its use.

According to an aspect of the present invention, there is provided a supporting apparatus for a portable computer, the portable computer including a base part and a pivoting part pivotally coupled to the base part, the apparatus comprising: a support structure projecting from side rear portions of the base part, so as to provide support for a pivoting of the pivoting part.

According to another aspect of the present invention, there is provided a portable computer comprising: a base part; a pivoting part pivotally coupled to the base part; and a support structure projecting from side rear portions of the base part, so as to provide support for a pivoting of the pivoting part.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Hereinafter, preferred embodiments of a supporting apparatus of a portable computer according to the present invention will be explained in detail with reference to the accompanying drawings.

In the present application, a "floor" means any surface that provides support, and is not limited to a floor of a room or area.

Figure 1:
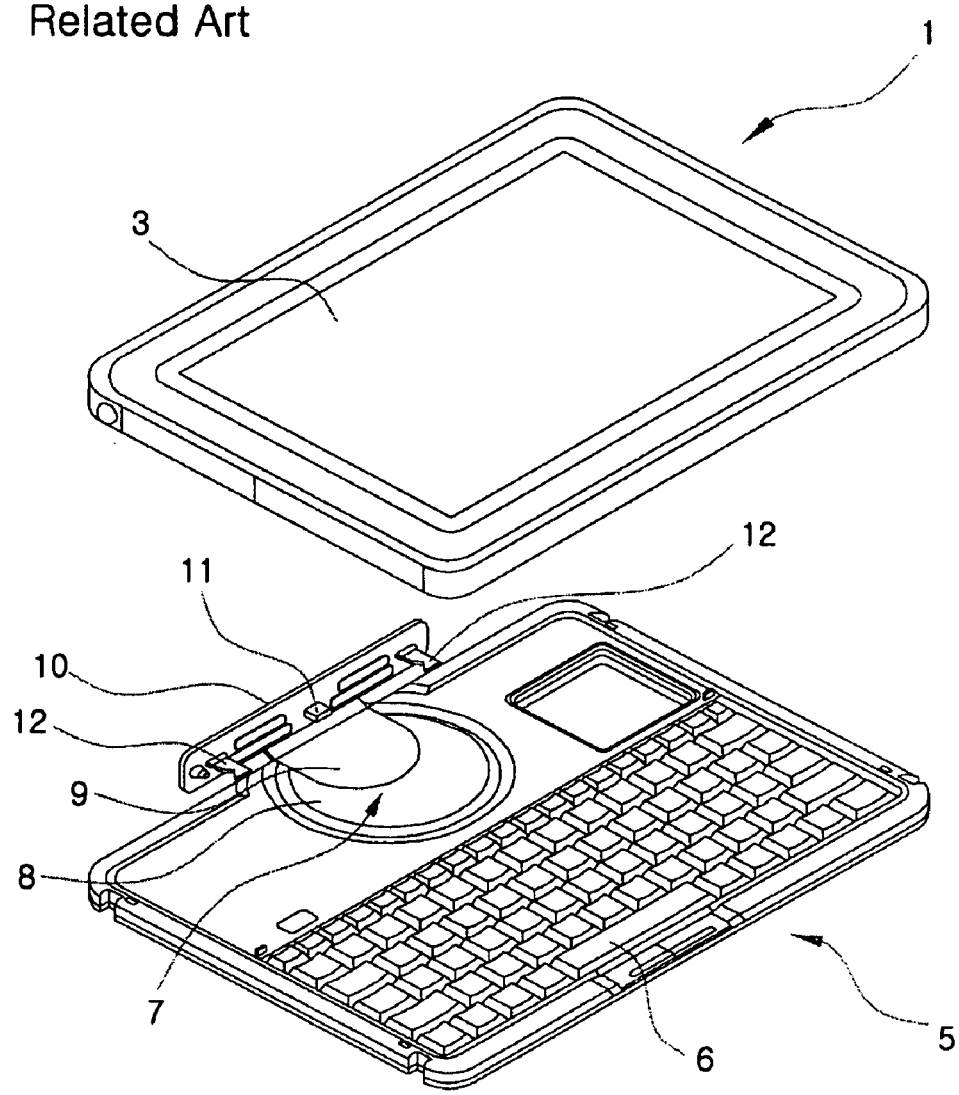
FIG. 1 is a perspective view showing a notebook computer of portable computers according to a related art.
Figure 2A:
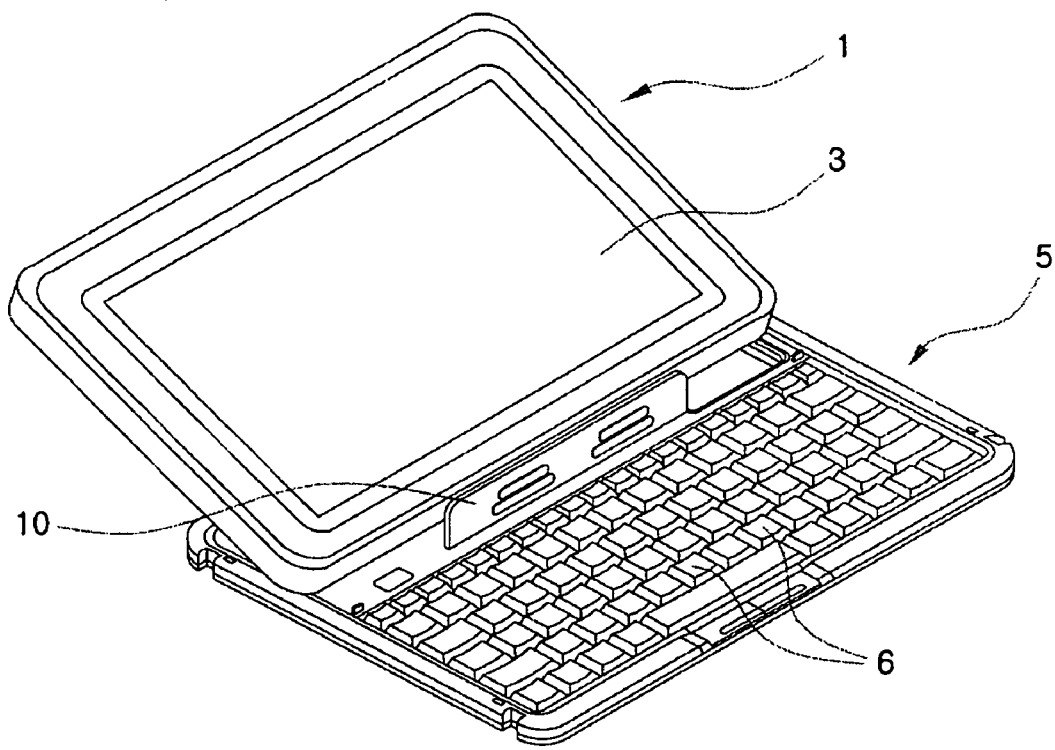
FIG. 2 is an exploded perspective view showing a tablet computer and a keyboard according to a related art.
Figure 2B:
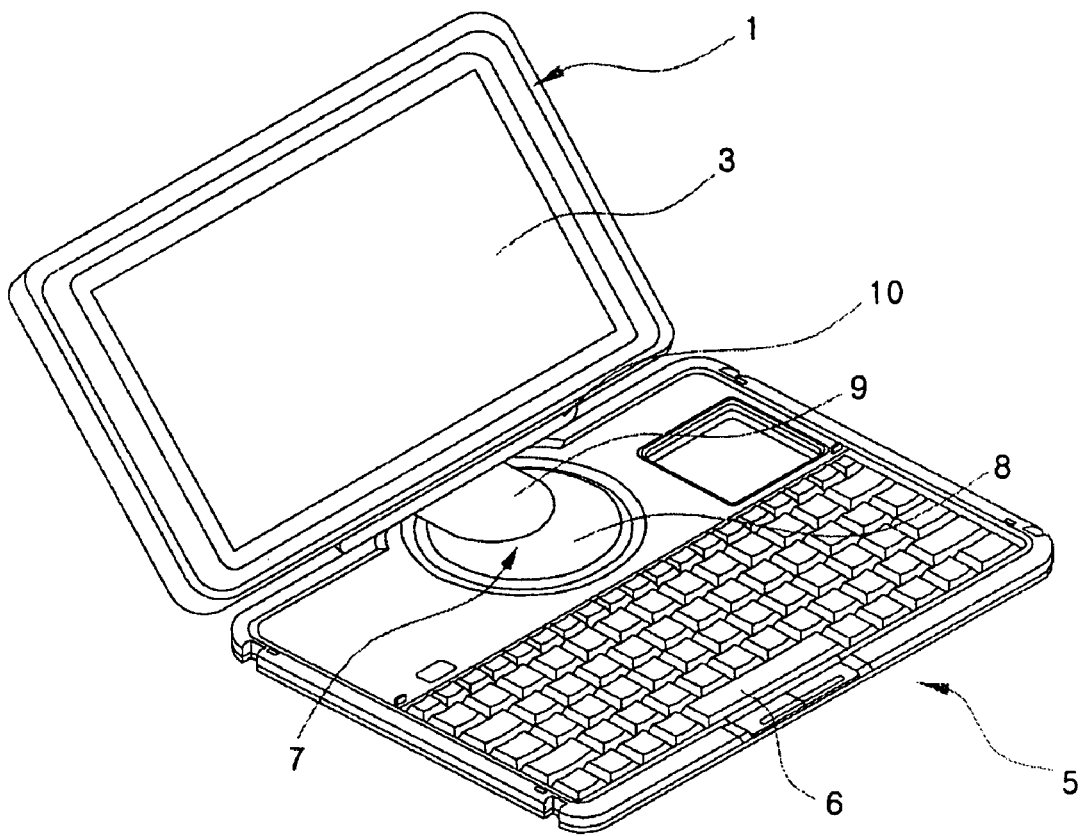
Figure 3:
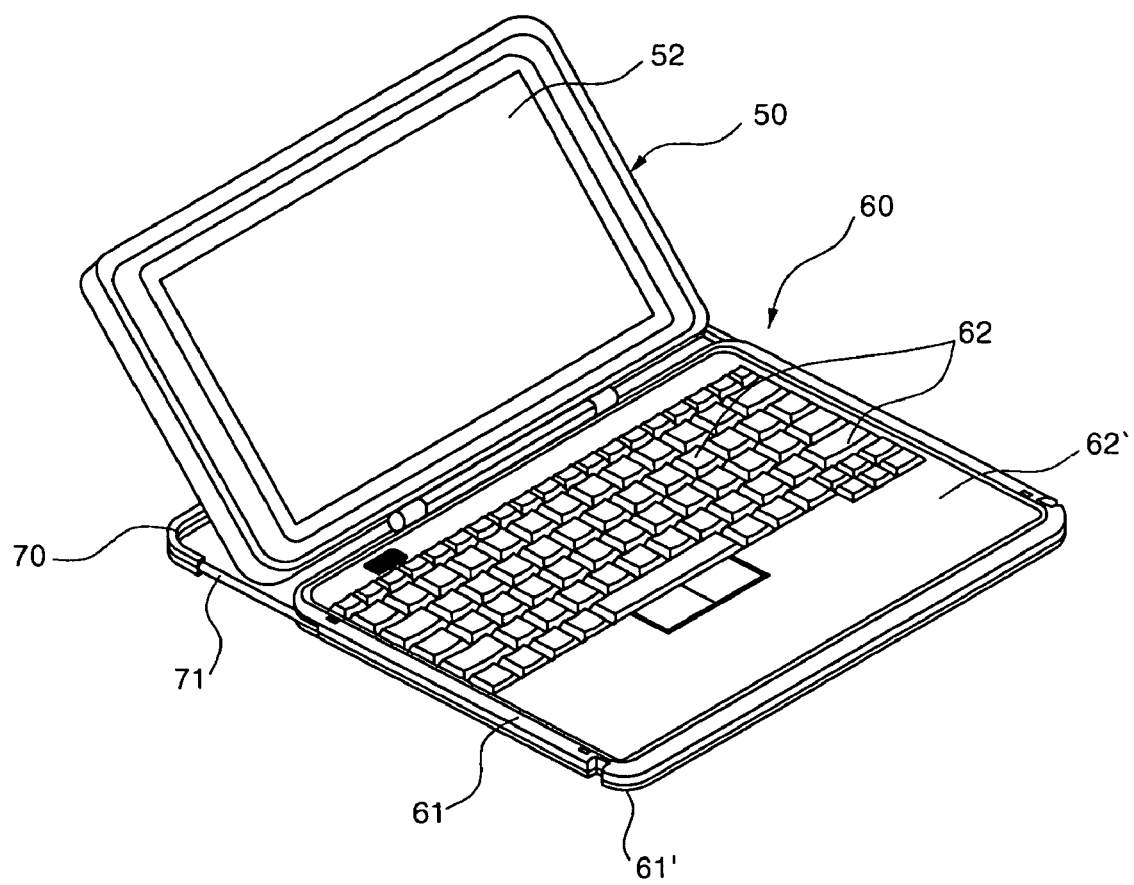
FIG. 3 is a perspective view showing a first embodiment of a supporting apparatus for a portable computer according to the present invention.
Figure 4A:
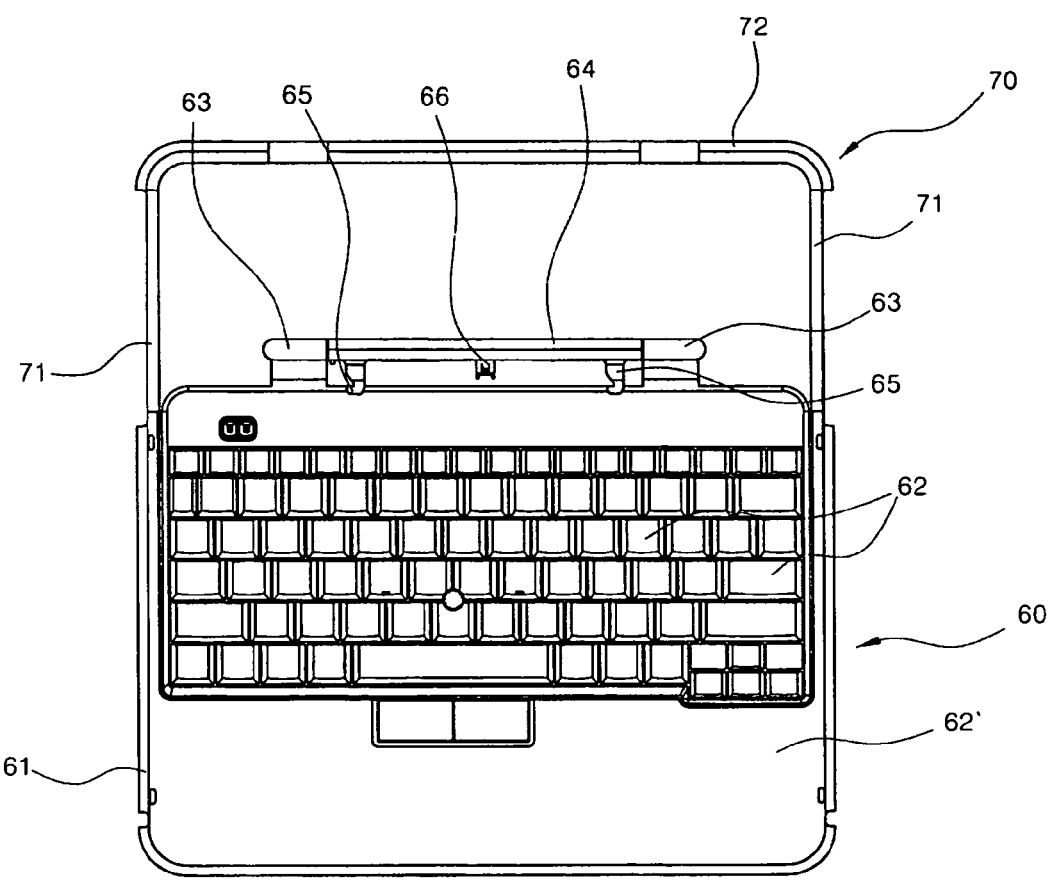
FIG. 4a is a plane view showing the state that supporting legs of the supporting apparatus of FIG. 3 are projected.
Figure 4B:
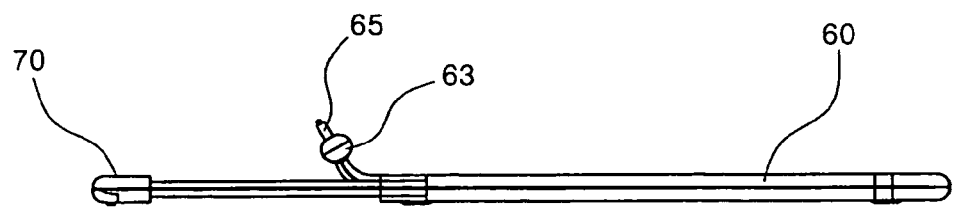
FIG. 4b is a side view showing the state that the supporting legs of the supporting apparatus of FIG. 3 are projected.
Figure 4C:
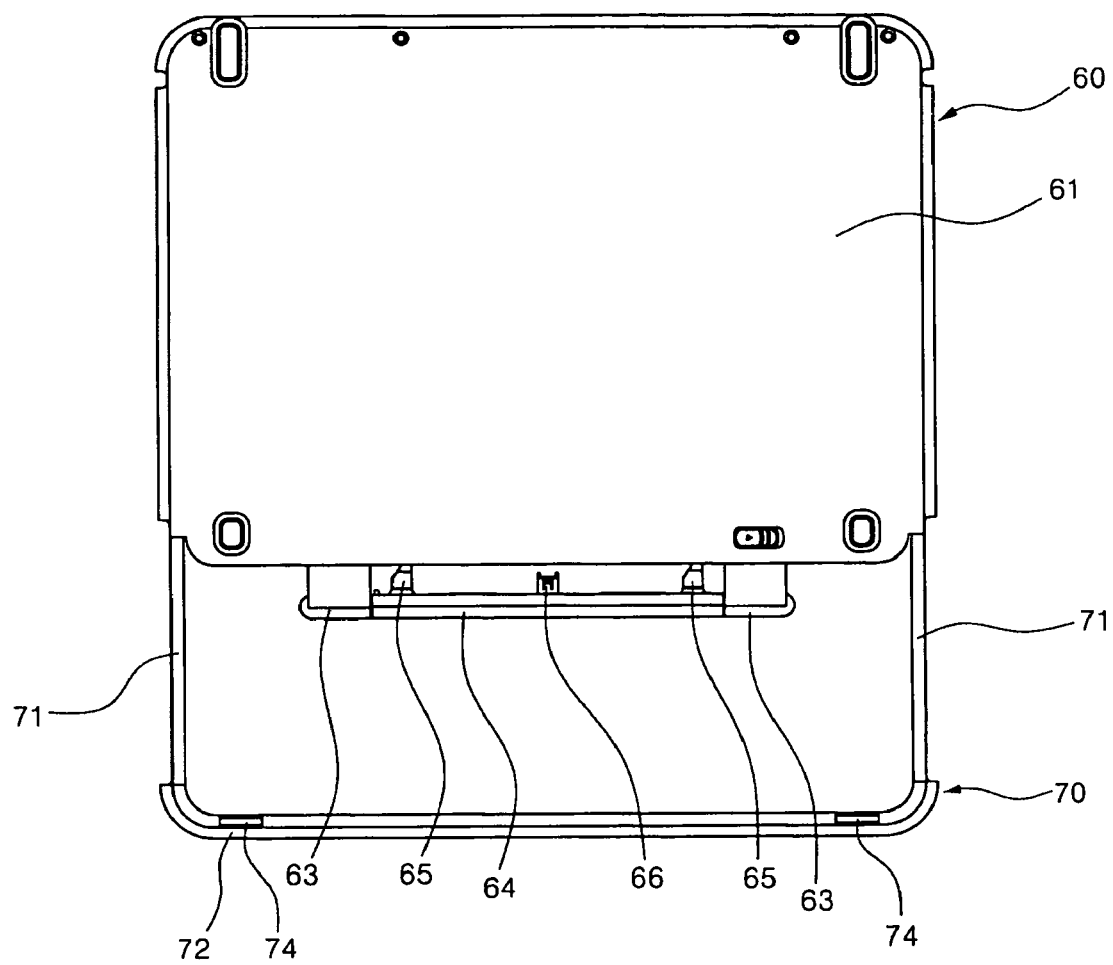
FIG. 4c is a bottom view showing the state that the supporting legs of the supporting apparatus of FIG. 3 are projected.
Figure 5A:
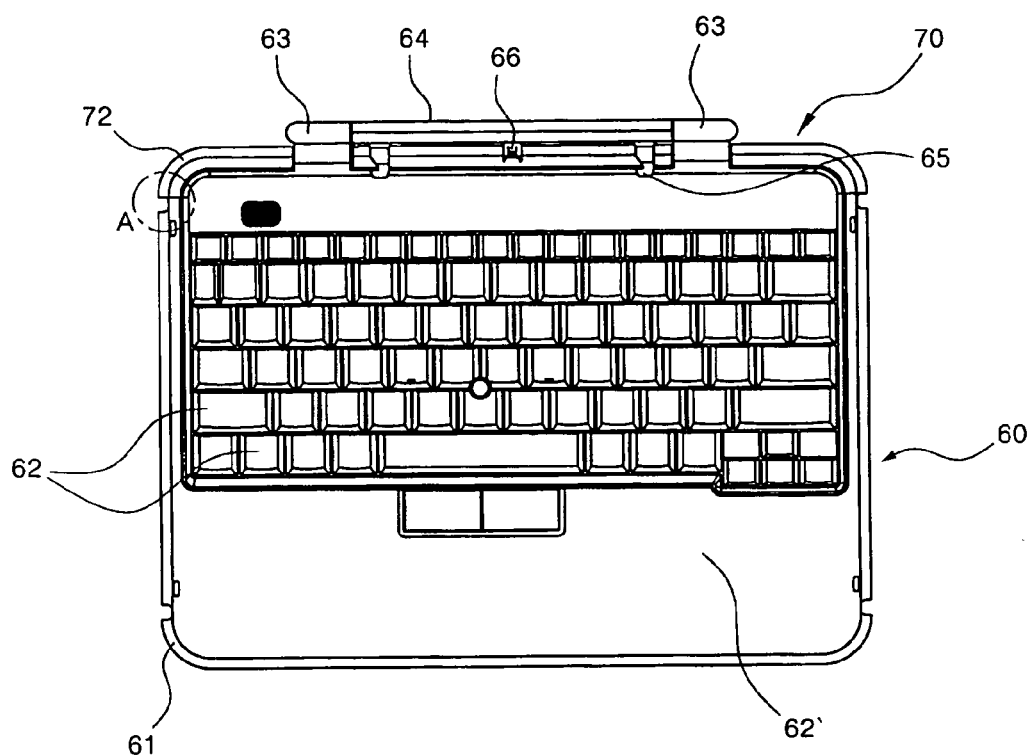
FIG. 5a is a plane view showing the state that the supporting legs of the supporting apparatus of FIG. 3 are inserted fully into a keyboard.
Figure 5B:
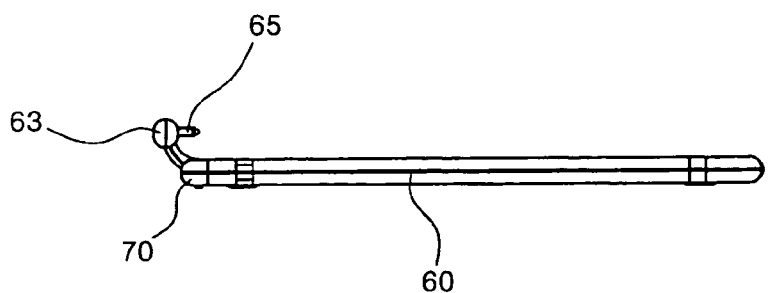
FIG. 5b is a side view showing the state that the supporting legs of the supporting apparatus of FIG. 3 are inserted fully into the keyboard.
Figure 5C:
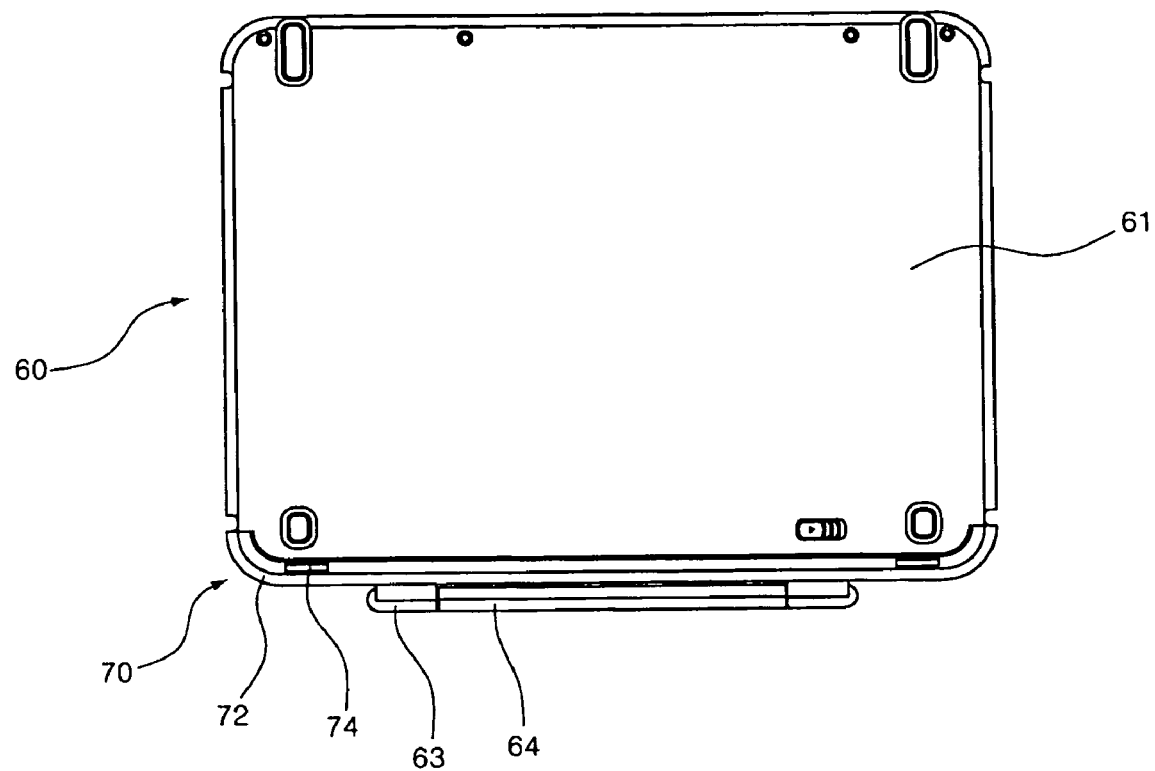
FIG. 5c is a bottom view showing the state that the supporting apparatus of FIG. 3 are inserted fully into the keyboard.

FIG. 3 is a perspective view showing a first embodiment of a supporting apparatus of a portable computer according to the present invention; FIGS. 4a to 4c are respectively a plane view, a side view, and a bottom view showing the state that a supporting leg of the supporting apparatus of FIG. 3 is projected from a keyboard body; and FIGS. 5a to 5c are respectively a plane view, a side view, and a bottom view showing the state that the supporting leg of the supporting apparatus of FIG. 3 is received in the keyboard body.

As shown in FIG. 3, the portable computer is a tablet computer 50 (pivoting portion). The tablet computer 50 is optionally mounted on a keyboard 60 (base portion) and may be pivotally unfolded from the keyboard 60 at a predetermined angle for use. The tablet computer 50 includes a display 52 that occupies nearly the entire surface of the tablet computer 50. The tablet computer 50 is formed in a flat plate shape. Various parts constituting the tablet computer 50 are installed therein. The display 52 provided in the tablet computer 50 generally has a function of a touch screen.

The keyboard 60, which is optionally connected to the table computer 50, is formed in a flat plate shape. The keyboard 60 is generally manufactured so that the shapes and areas of the corresponding surfaces of the tablet computer 50 and the keyboard 60 accord with each other. But is possible to have the keyboard 60 be smaller than the table computer 50.

The appearance of the keyboard 60 is formed by an upper case 61 and a lower case 61'. A plurality of keys 62 are arranged at the upper surface of the keyboard 60. The keys 62, through which information is inputted by users and each of which has its own function, are arranged in parallel in several rows. The keys 62 are arranged at a retracted position from the front end of the upper surface of the keyboard 60. Thus, a space between the front end of the upper surface of the keyboard 60 and the keys 62 is provided with an armrest 62' for supporting users' arms during typing.

As shown in FIGS. 4a-4c, rotational center portions 63 are provided at both sides of the rear end of the keyboard 60. A connecting bracket 64 is installed in the rotational center portions 63. The connecting bracket 64 rotates with respect to the rotational center portions 63, so that the tablet computer 50 can be pivotally folded and unfolded with respect to the keyboard 60.

Engaging hooks 65 are provided at both ends of the connecting bracket 64. The engaging hooks 65 function to engage the connecting bracket 64 and the tablet computer 50. The connecting bracket 64 is provided with a connector 66. The connector 66 functions to electrically connect the keyboard 60 and the tablet computer 50. The connector 66 is connected to a connector provided in the tablet computer 50 at the same time when the tablet computer 50 is mounted on the connecting bracket 64.

In the meantime, a supporting leg 70 is installed at the rear end of the keyboard 60. The supporting leg 70 may be manufactured, for example, by bending a wire of a relatively large diameter into a "Π"-shape. The supporting leg 70 may be formed by injection molding. Connecting portions 71 are formed at both ends of the supporting leg 70 in parallel. The connecting portions 71 are received into receiving portions (grooves) of the keyboard 60 that are extending along side edge portions of the keyboard 60, or projected at a predetermined length for supporting the keyboard 60, to which the tablet computer 50 is mounted.

The connecting portions 71 of the supporting leg 70 are formed with stoppers so that the supporting leg 70 does not get detached completely from the keyboard 60 or is selectively fixed at certain positions.

The portions of the supporting leg 70, except for the connecting portions 71 of the supporting leg 70, are provided with a protecting member 72. When the supporting leg 70 is formed, for example, of metal, the protecting member 72 surrounds the supporting leg 70 and then protects its periphery from being damaged.

When the supporting leg 70 is projected from the keyboard 60 so as to support the tablet computer 50 coupled thereto, the protecting member 72 is rested on a floor where the tablet computer 50 and the keyboard 60 are supported, so that the height of the whole keyboard 60 structure is generally uniformly maintained and then the keyboard 60 is stably supported without motion.

In addition, when the connecting portions 71 of the supporting leg 70 are inserted into the rear side portions of the keyboard 60, the protecting member 72 comes in contact with inlets of the receiving portions of the keyboard 60, which is fully shown in "A" of FIG. 5a. As a result, if the connecting portions 71 of the supporting leg 70 are inserted fully into the keyboard 60, only the protecting member 72 appears and the protecting member 72 completes the overall shape of the keyboard 60 as shown in FIGS. 5b and 5c. Therefore, if the protecting member 72 and the keyboard 60 are made of the same material, the use of the keyboard 60 with the supporting legs 70 inserted therein achieves a sense and appearance of unity.

Friction members 74 are installed on the bottom of the protecting member 72 of the supporting leg 70. Predetermined frictional forces are generated between the friction members 74 and the floor supporting the keyboard 60, causing the keyboard 60 not to move arbitrarily. Since the friction members 74 are provided on the bottom of the protecting member 72, the friction members 74 also practically cause the height of the whole keyboard 60 to be constantly and uniformly maintained. The friction members 74 are provided at both sides of the bottom of the protecting member 72 of the supporting leg 70.

The operation of the supporting apparatus of the present invention with the above constitutions will be explained below.

Figure 6A:
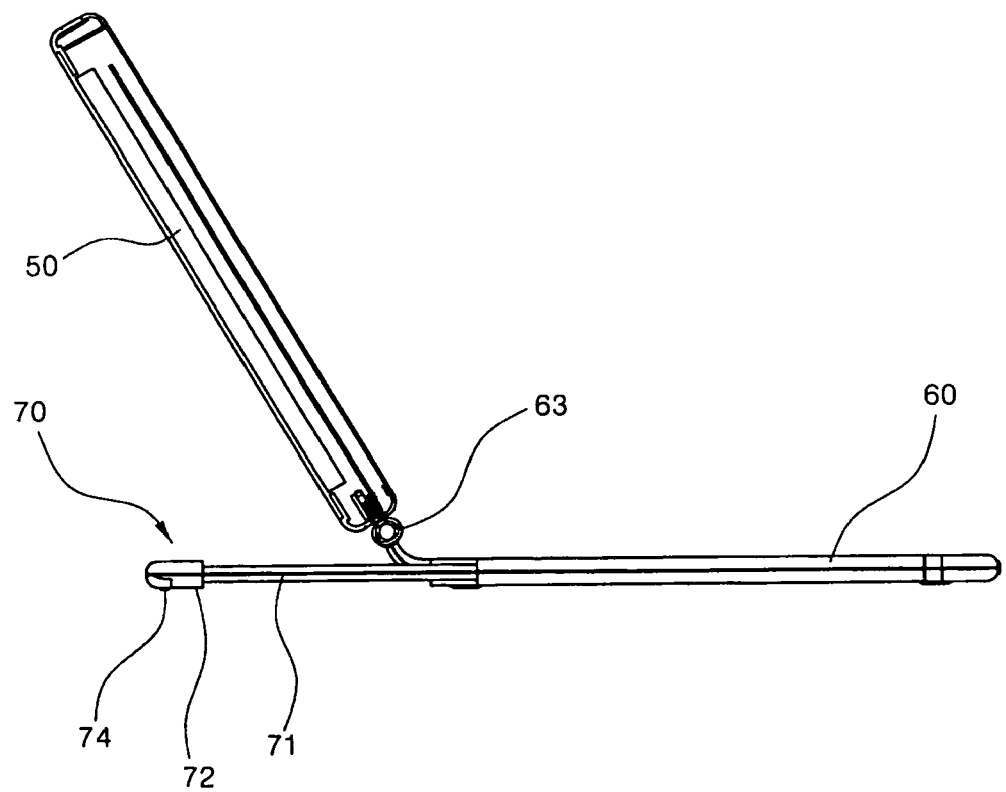
FIGS. 6a and 6b are view for illustrating an operation of the supporting apparatus of FIG. 3.
Figure 6B:
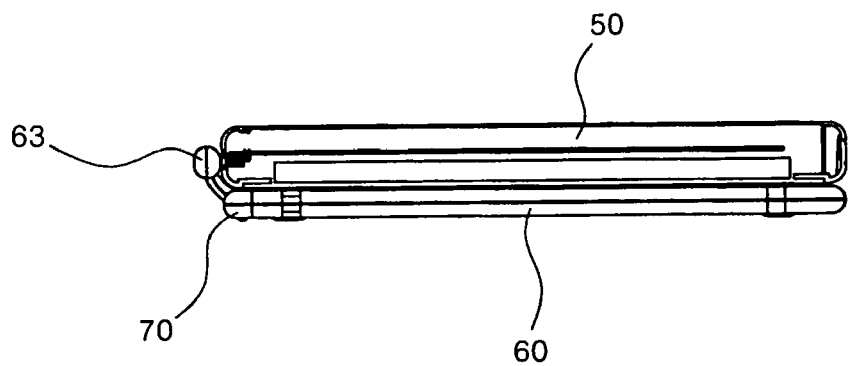

First, FIGS. 6a and 6b are side views showing the state that the tablet computer 50 is mounted on the keyboard 60 according to an embodiment of the present invention. That is, FIG. 6a is a side view showing that the tablet computer 50 is pivotally unfolded with respect to the upper surface of the keyboard 60; and FIG. 6b is a side view showing that the tablet computer 50 is pivotally folded onto the upper surface of the keyboard 60.

In the present invention, as shown in FIG. 6a, the supporting leg 70 is projected from the rear end of the keyboard 60 and supported on the floor, so that the tablet computer 50 is mounted on the keyboard 60 for use in various states. That is, even though the tablet computer 50 is pivotally pulled back at a considerable angle from the rear end of the keyboard 60, the front end of the keyboard 60 would not be raised. Thus, in the present invention, by adjustably controlling the length of the supporting leg 70 projected from the keyboard 60 (i.e., the amount that the leg 70 is extended out from the read end of the keyboard 60), an unfolded angle of the tablet computer 50 can be effectively set up variously.

In the meantime, the supporting leg 70 may be fully received into the keyboard 60. Such a state is shown in FIGS. 5a, 5b, and 6b. In particular, FIG. 6b shows that the supporting leg 70 is inserted completely into the keyboard 60 and the tablet computer 50 is folded completely onto the keyboard 60. In such a state, the tablet computer 50 can be portable together with the keyboard 60.

Next, as shown in FIG. 6a, a user can extend out the supporting leg 70 from the keyboard 60, causing the keyboard 60, to which the tablet computer 50 is mounted, to be stably supported on the floor. At this time, if the angle between the front surface of the tablet computer 50 and the upper surface of the keyboard 60 is large, the supporting leg 70 can be further pulled out to extend from the keyboard 60.

FIGS. 7 to 9b show a second embodiment of the supporting apparatus of the portable computer according to the present invention. According to this embodiment, the portable computer illustrated in the present embodiment is a tablet computer 150, wherein the tablet computer 150 (pivoting portion) is mounted on a keyboard 160 (base portion) and then is pivotally unfolded at predetermined angles for use. A display 152 occupies nearly the entire front surface of the tablet computer 150. The tablet computer 150 is formed in a flat plate shape. Various parts constituting the tablet computer are installed therein. The display 152 provided in the tablet computer 150 generally has a function of a touch screen.

The keyboard 160, which is optionally connected to the tablet computer 150 for use, is formed in a flat plate shape. The keyboard 160 is generally manufactured so that the shapes and areas of the corresponding surfaces of the tablet computer 150 and the keyboard 160 accord with each other. It is also possible to have the keyboard 160 that is smaller than the tablet computer 150.

The appearance of the keyboard 160 is formed by an upper case 161 and a lower case 161'. A plurality of keys 162 are arranged at the upper surface of the keyboard 160. The keys 162, through which information is input by users and each of which has its own function, are arranged in parallel in several rows. The keys 162 are arranged at a retracted position from the front end of the upper surface of the keyboard 160. Thus, a space between the front end of the upper surface of the keyboard 160 and the keys 162 is provided with an armrest 162'for supporting users' arms during typing.

Hinge portions 163 are provided at both sides of the rear end of the keyboard 160. A connecting bracket 164 is installed in the hinge portions 163. The connecting bracket 164 rotates with respect to the hinge portions 163, so that the tablet computer 150 can be pivotally folded and unfolded with respect to the keyboard 160.

Engaging hooks 165 are provided at both ends of the connecting bracket 164. The engaging hooks 165 serve to engage the connecting bracket 164 and the tablet computer 150. The connecting bracket 164 is provided with a connector 166. The connector 166 functions to electrically connect the keyboard 160 and the tablet computer 150. The connector 166 is connected to a connector provided in the tablet computer 150 at the same time when the tablet computer 150 is mounted on the connecting bracket 164.

In the meantime, a supporting leg 170 is installed at the rear end of the keyboard 160. The supporting leg 170 may be manufactured, for example, by bending a wire of a relatively large diameter into a "π"-shape. The supporting leg 170 may be formed through the injection molding. Connecting portions 171 are formed at both ends of the supporting leg 170 in parallel. The connecting portions 171 are received into receiving portions (grooves) formed and extending along the side edge portions of the keyboard 160, or projected at a predetermined length for supporting the keyboard 160, to which the tablet computer 150 is mounted.

The connecting portions 171 of the supporting leg 170 may be formed with such structures that the supporting leg 170 does not get detached from the keyboard 160 arbitrarily or is selectively fixed certain positions.

The portions of the supporting leg 170, except for the connecting portions 171 of the supporting leg 170, are provided with a protecting member 172. When the supporting leg 170 is formed, for example, of metal, the protecting member 172 surrounds the supporting leg 170 and then protects its periphery from being damaged.

When the supporting leg 170 is projected from the keyboard 160 so as to support the tablet computer 150 coupled thereto, the protecting member 172 is rested on the floor, so that the height of the whole keyboard 160 is uniformly maintained and then the keyboard 160 is stably supported without motion.

In addition, when the connecting portions 171 of the supporting leg 170 are inserted into the rear portions of the keyboard 160, the protecting member 172 comes in contact with inlets of the receiving portions of the keyboard 160. Thus, if the connecting portions 171 of the supporting leg 170 are inserted fully into the rear side portions of the keyboard 160 and positioned in a space between the upper case 161 and the lower case 161', only the protecting member 172 appears and the protecting member 172 completes the overall shape of the keyboard 160. Therefore, if the protecting member 172 and the keyboard 160 are the same material, an appearance of the keyboard 160 with the supporting leg 170 received therein may achieve a sense of unity.

Friction members 174 (see FIGS. 6*a* and 6*b*) are installed on the bottom of the protecting member 172 of the supporting leg 170. Predetermined frictional forces are generated between the friction members 174 and the floor supporting the keyboard 160, causing the keyboard 160 not to move arbitrarily. Since the friction members 174 are provided on the bottom of the protecting member 172, the friction members 174 also practically cause the height of the whole keyboard 160 to be constantly and uniformly maintained. The friction members 174 are provided at both sides of the bottom of the protecting member 172 of the supporting leg 170.

Figure 7:
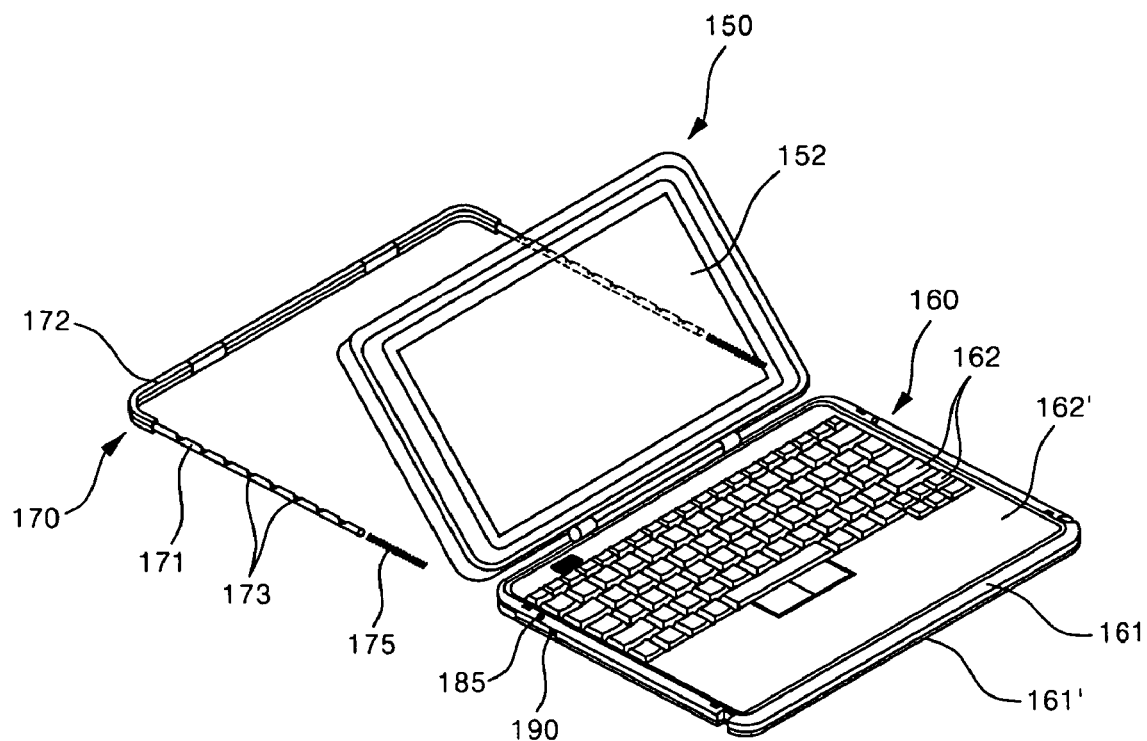
FIG. 7 is an exploded perspective view showing constitutions of a supporting apparatus for a portable computer according to a second embodiment of the present invention.
Figure 8:
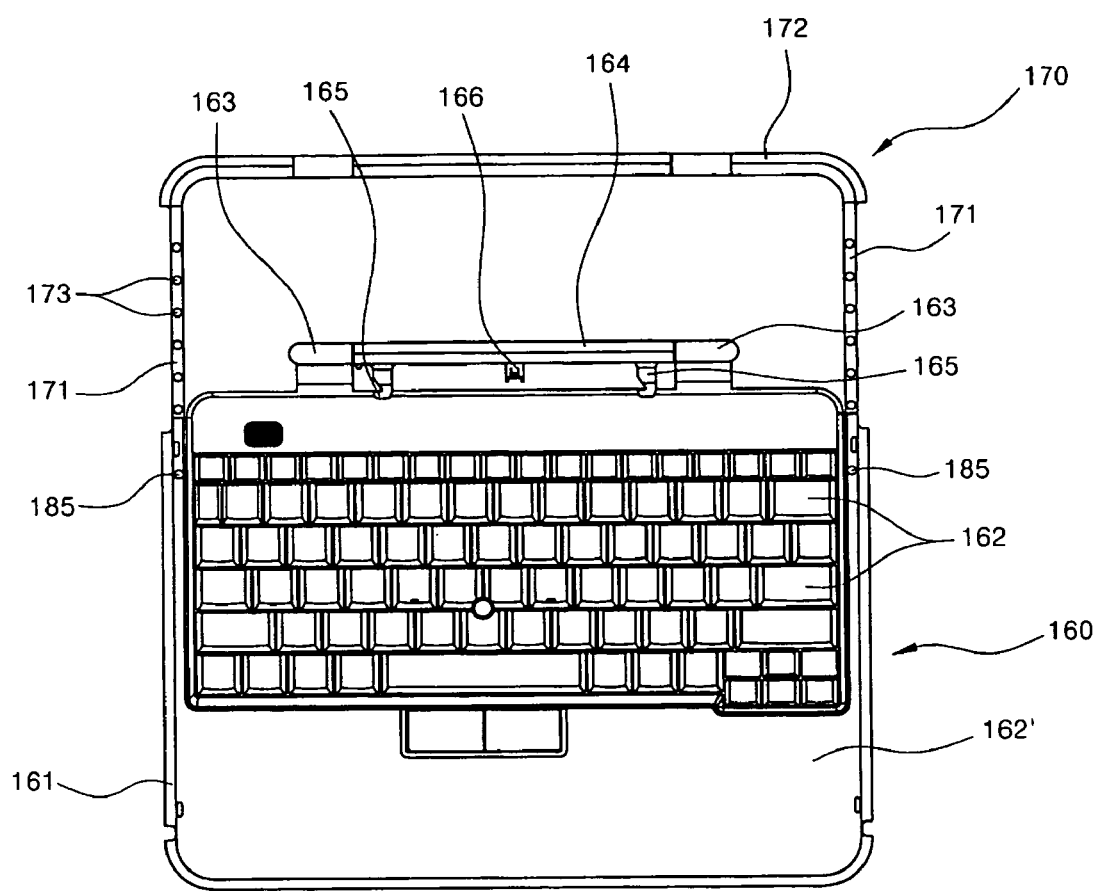
FIG. 8 is a plane view showing a keyboard of the portable computer and a supporting leg of the supporting apparatus of FIG. 7.

As shown in FIGS. 7 and 8, at least one of the connecting portions 171 of the supporting leg 170 is formed with a plurality of stopper holes 173. The plurality of stopper holes 173 are formed at predetermined intervals, but need not be formed at constant intervals. It is preferable that the stopper holes 173 are formed in both connecting portions 171, which are provided at both ends of the supporting leg 170.

The supporting leg 170 is subjected to an elastic force in a direction where the supporting leg 170 is projected out of the keyboard 160. That is, elastic members 175 are installed in the keyboard 160, so that the supporting leg 170 can be projected out of the keyboard 160. In the present embodiment, each elastic member 175 comprises, but is not limited to, a coil spring. The elastic members 175 may also comprise any constitution providing an elastic force in a direction to which the supporting leg 170 is projected out. Each elastic member 175 is installed in the keyboard 160 and is used to fix an end of the elastic member 175 to the inner space of the keyboard 160.

Figure 9A:
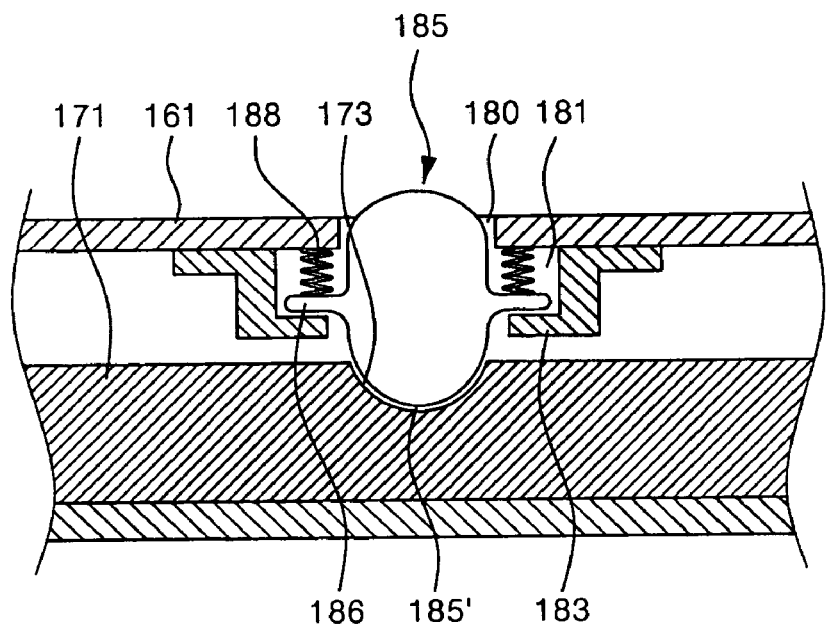
FIG. 9a is a sectional view showing a leg stopper and its periphery of the supporting apparatus of FIG. 7 according to the second embodiment of the present invention.

Constitutions for controlling a length of the supporting leg 170 projected from the rear side of the keyboard 160 will be explained. As shown in FIG. 9*a*, two through installation holes 180 are formed respectively in the upper case 161 of both ends of the keyboard 160. Annular grooves 181 corresponding to the through installation holes 180 are formed on the inner surface of the upper case 161. Each of the annular grooves 181 is formed by an installation member 183 in the present embodiment. The installation members 183 are provided on the inner surface of the upper case 161 and form the annular grooves 181.

A leg stopper 185 is installed in each of the through installation holes 180. Each leg stopper 185 is selectively rested in one of the stopper holes 173 formed on each of the connecting portions 171 of the supporting leg 170, whereby the length of the supporting leg 170 projected out of the keyboard 160 can be varied. Each leg stopper 185 is installed in the corresponding through installation hole 180, so that the upper surface and the lower surface of the leg stoppers 185 are somewhat projected from the upper surface of the upper case 161 and the lower surface of the installation member 183, respectively. The lower surface of each leg stopper 185, which is a latching portion 185', is sized so as to be rested in the stopper holes 173. The surface of the latching portion 185' is a curved surface.

A flange 186 is formed around the outer periphery surface of each of the leg stoppers 185. The flange 186 is rested in the annular groove 181, and then prevents the leg stopper 185 from being out of place arbitrarily.

The leg stopper 185 intends that the latching portion 185' of the leg stopper 185 is projected out of the installation member 183 by push springs 188. The push springs 188 and the elastic members 175 are designed so that a force for holding the latching portion 185' in the stopper holes 173 by the push springs 188 is smaller than a force for projecting the supporting leg 170 from the keyboard 160 by the elastic members 175. Thus, at a stage where the supporting leg 170 is fully inserted in the keyboard 160, the supporting leg 170 can be projected out regardless of the leg stoppers 185 pushed by the push springs 188. This is because the force for holding the latching portion 185' in the stopper holes 173 is smaller than the force for projecting the supporting leg 170.

However, when the supporting leg 170 is almost projected out of the keyboard 160, since the elastic force of the elastic members 175 does not act further, the leg stoppers 185 prevent the supporting leg 170 from being further projected, so that the supporting leg 170 is not projected out.

For example, it is preferable that the elastic forces from the elastic members 175 and the push springs 188 be designed so that the supporting leg 170 stops when the leg stoppers 185 are rested in the stopper holes 173 provided at the front most ends or the next ones of the connecting portions 171.

The leg stoppers 185 are formed so that the upper surfaces of the leg stoppers 185 are slightly projected from the upper surface of the upper case 161 as shown in FIG. 9*a*. Due to this configuration, if the tablet computer 150 is folded onto the upper surface of the keyboard 160, the tablet computer 150 pushes the leg stoppers 185 downwardly, so that the latching portions 185' become forcibly rested in the stopper holes 173. Thus, the supporting leg 170 is not further projected out even by the force from the elastic members 175.

Figure 9B:
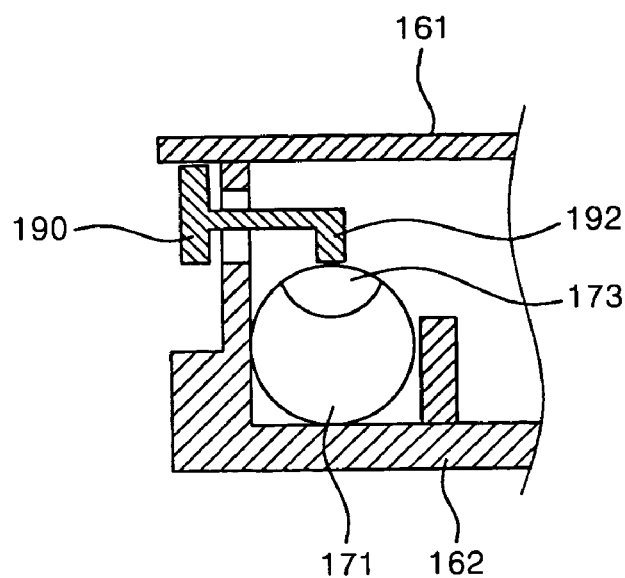
FIG. 9b is a sectional view showing a locking knob and its periphery of the supporting apparatus of FIG. 7 according to the second embodiment of the present invention.

In the meantime, as shown in FIG. 9b, a locking knob 190 having a hook portion 192, which is selectively hooked to one of the stopper holes 173 of the connecting portion 171 by a user's option, may be installed additionally on at least one side surface of the keyboard 160. The locking knob 190 is exposed to the outer side surface of the keyboard 160, and then may be operated by a user. In the present embodiment, the locking knob 190 is provided on the side surface of the keyboard 160 and is moved upward and downward, so that the hook portion 192 is selectively hooked to one of the stopper holes 173.

The locking knob 190 is optionally provided. The locking knob 190 is useful when it is necessary that the supporting leg 170 be received in the keyboard 160 in the state that the tablet computer 150 is not rested onto the keyboard 160. In addition, the locking knob 190 is necessary to fix the supporting leg 170 that is relatively incompletely projected.

Hereinafter, the operation of the second embodiment according to the present invention will be explained in detail with reference to FIGS. 10a and 10b.

Figure 10A:
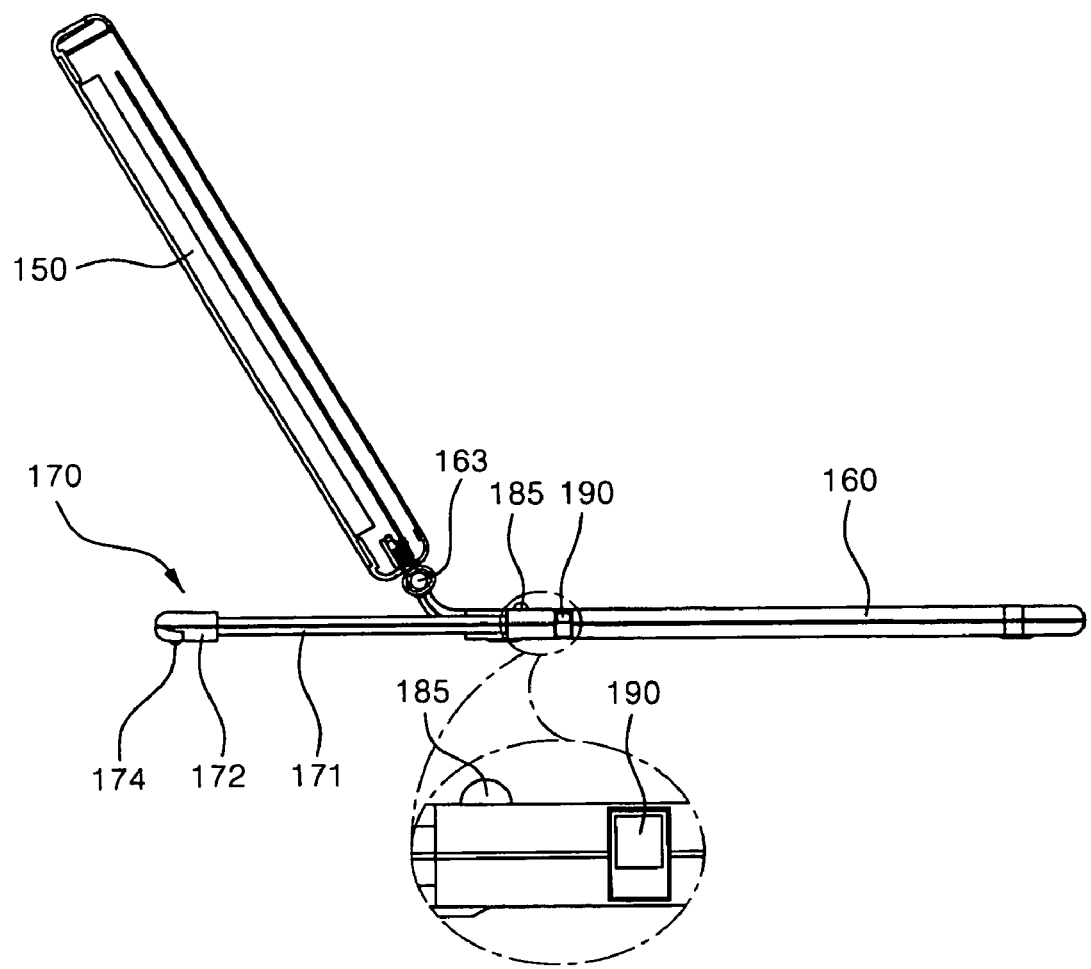
FIGS. 10a and 10b are views illustrating an operation of the supporting apparatus of FIG. 7.
Figure 10B:
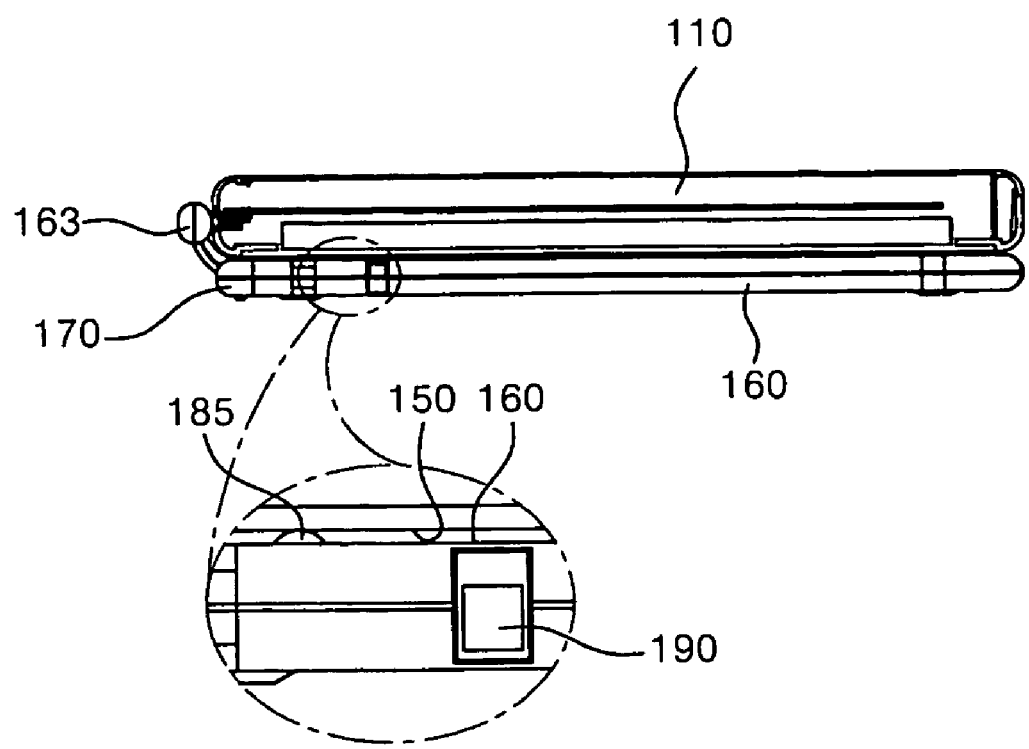

FIG. 10a is a side view showing the state that the tablet computer 150 is unfolded with respect to the upper surface of the keyboard 160, and FIG. 10b is a side view showing the state that the tablet computer 150 is folded onto the upper surface of the keyboard 160.

In this embodiment, as shown in FIG. 10a, the supporting leg 170 projects from the rear side ends of the keyboard 160 and supported on the floor, so that the tablet computer 150 is mounted on the keyboard 160 for use in various states. In other words, even though the tablet computer 150 is pulled back at a considerable angle from the rear end of the keyboard 160, the front end of the keyboard 160 would not be raised.

In such a state, the supporting leg 170 is projected out of the keyboard 160 by the elastic force of the elastic members 175. When the elastic force from the elastic members 175 is fully applied and does not act any further, the latching portions 185' of the leg stoppers 185 are rested in the stopper holes 173 of the connecting portions 171 by the elastic forces of the push springs 188. Therefore, the supporting leg 170 is not moved within the keyboard 160 arbitrarily.

In the meantime, the extended supporting leg 170 may be fully inserted into the keyboard 160. Such a state is shown in FIG. 10b. FIG. 10b shows the state that the supporting leg 170 is fully inserted into the keyboard 160 and the tablet computer 150 is folded completely onto the keyboard 160. In such a state, the tablet computer 150 and the keyboard 60 are aligned and become one portable unit. At this time, the tablet computer 150 is rested onto the upper surface of the keyboard 160, by which the upper surfaces of the leg stoppers 185 are pushed downwardly. Thus, the latching portions 185' are securely and lockingly rested in the stopper holes 173 of the connecting portions 171, whereby the supporting leg 170 is prevented from getting out of the keyboard 160 arbitrarily.

In such a state, if a user unfolds the tablet computer 150 with respect to the keyboard 160 in order to use the tablet computer 150, the tablet computer 150 does not push the upper surfaces of the leg stoppers 185 downwardly. Therefore, the leg stoppers 185 are lifted against the elastic force of the push springs 188 by the elastic force, which causes the elastic members 175 to push the supporting leg 170 out.

Thus, the latching portions 185' of the leg stoppers 185 get out of the stopper holes 173, so that the supporting leg 170 is projected out of the keyboard 160.

If the supporting leg 170 is almost projected from the keyboard 160, the elastic force from the elastic members 175 does not act further upon the supporting leg 170. In addition, the supporting leg 170 is no more projected since the latching portion 185' of each of the leg stoppers 185 is hooked to the front most one or the adjacent one of the plurality of stopper holes 173.

In the meantime, the locking knob 190 may be optionally employed. For example, as discussed above, the installation state of the supporting leg 170 can be maintained without the locking knob 190. However, in such a case, if the tablet computer 150 is not rested onto the upper surface of the keyboard 160, the supporting leg 170 may be always projected from the keyboard 160 to a certain extent.

However, if the locking knob 190 is employed, the length of the supporting leg 170 projected from the keyboard 160 may be adjusted at desire. That is, even when the tablet computer 150 is not rested onto the keyboard 160, the supporting leg 170 can be maintained as inserted fully into the keyboard 160 by locking the locking knob 190.

In addition, the projecting state of the supporting leg 170 may be fixed by using the locking knob 190 when the supporting leg 170 is projected from the keyboard 160 to the desired extent.

In the meantime, as shown in FIG. 10a, if the keyboard 160, to which the tablet computer 150 is mounted, is stably supported on the floor by projecting the supporting leg 170 from the keyboard 160, an input process through the operation of the keys 162 of the keyboard 160 can be performed effectively. At this time, if the angle between the front surface of the tablet computer 150 and the upper surface of the keyboard 160 becomes large, the supporting leg 170 can be further projected from the keyboard 160 at different positions using the stopper holes 173.

Although the supporting apparatus according to the first and second embodiments of the present invention as shown in FIGS. 4a-10b have been described for use in a tablet computer provided with a keyboard, the supporting apparatus are equally applicable to any device in which a main body such as a display device is pivotally operated with respect to a base unit such as a keyboard part. For instance, the supporting apparatuses of FIGS. 4a-10b are fully applicable to computer notebooks.

Figure 11:
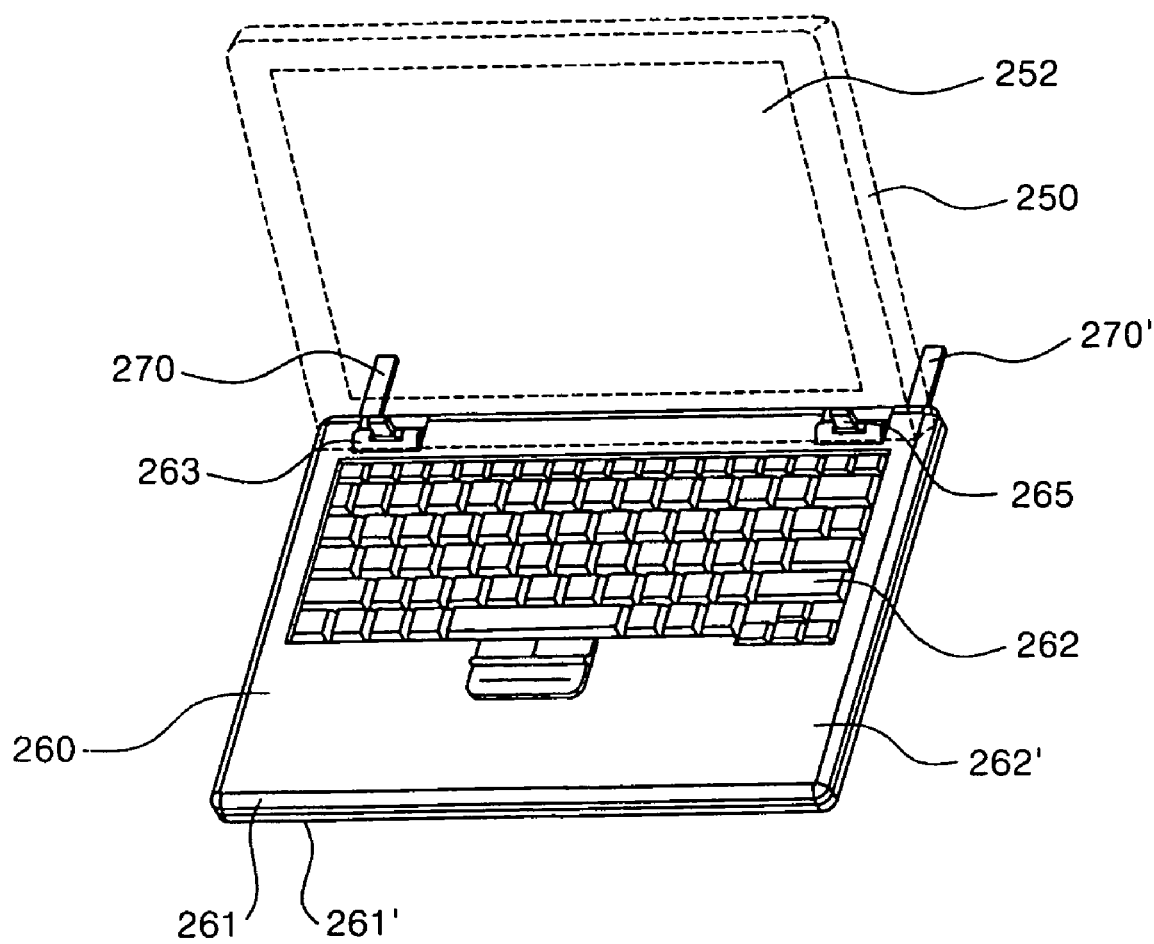
FIG. 11 is a perspective view showing a supporting apparatus for a portable computer according to a third embodiment of the present invention.
Figure 12:
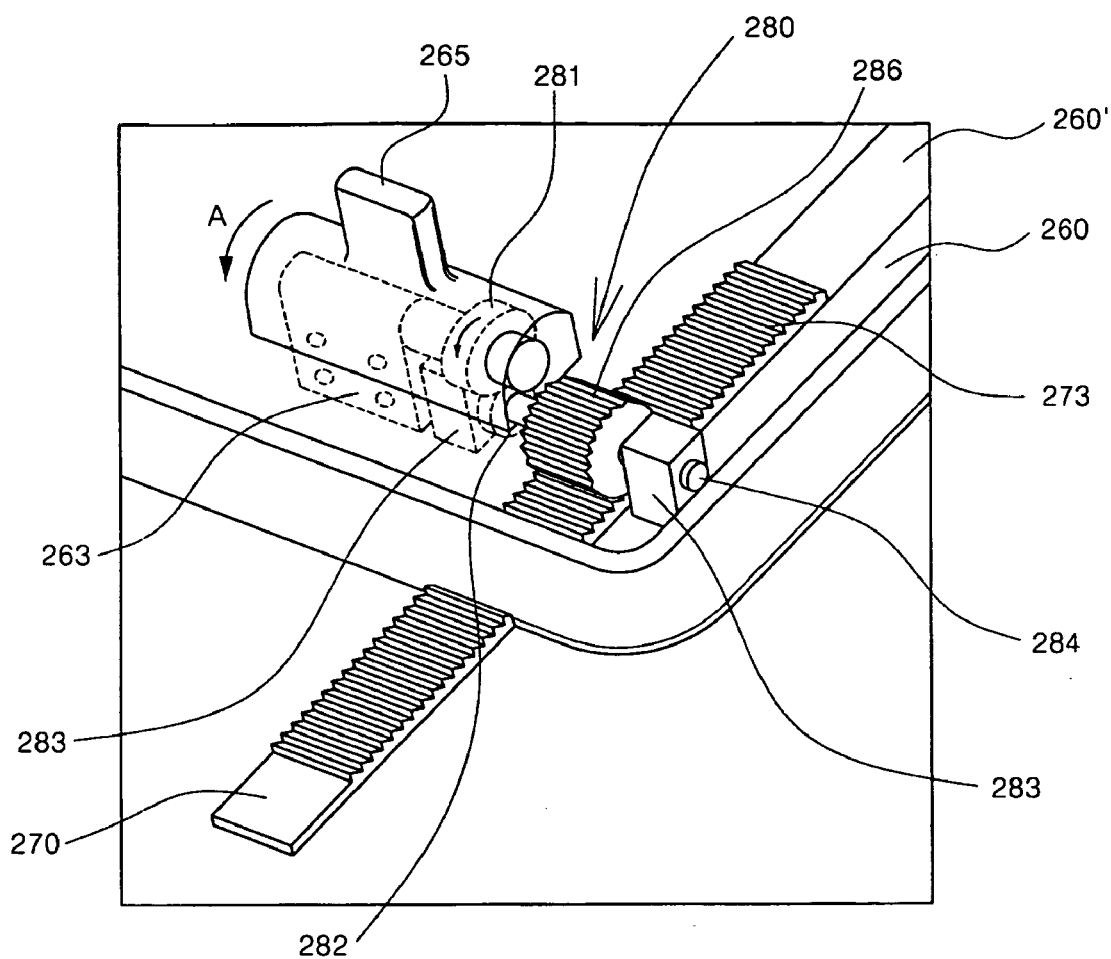
FIG. 12 is a perspective view showing in more detail components of the supporting apparatus of FIG. 11 according to the third embodiment of the present invention.

Next, FIGS. 11 and 12 show a supporting apparatus for a computer according to a third embodiment of the present invention. According to the figures, in the present embodiment, a pivoting portion 250 is adapted for pivoting upon hinge units 263 with respect to a base portion 260. The pivoting portion 250 corresponds to, for example, a display unit of a notebook computer or a main body of a tablet computer. The front surface of the pivoting portion 250, i.e., a surface that faces the upper surface of the base portion 260 when the pivoting portion 250 is folded onto the base portion 260, is provided with a display 252.

The base portion 260, where the portable computer is supported on a floor, corresponds to, for example, a main body (where a main board, memories, hard disk drive, and the like are provided) of the notebook computer or a keyboard (where a plurality of keys are arranged and which may support the tablet computer) of the tablet computer.

The appearance of the base portion 260 is defined by combining an upper case 261 and a lower case 261'. A plurality of keys 62 are arranged on the upper surface of the upper case 261 in rows. A user may input necessary information by pressing the keys 262 selectively.

The hinge units 263 cause the base portion 260 and the pivoting portion 250 to be pivotally connected to each other. That is, the pivoting portion 250 is folded or unfolded with respect to the upper surface of the base portion 260 through the hinge units 263.

Each of the hinge units 263 is connected to the base portion 260 at its one end and to the pivoting portion 250 at its other end. Connecting members 265 are connected to the pivoting portion 250 in the present embodiment, wherein each of the connecting members 265 is pivoted with respect to each of the hinge units 263 fixed to the base portion 260. The connecting member 265 is schematically shown in FIGS. 11 and 12, so that a constitution of practical connection to the pivoting portion 250 is omitted for convenience.

Supporting legs 270, 270' are provided at rear side end portions of the base portion 260. The supporting legs 270, 270' function to support the base portion 260 and the pivoting portion 250. A rack portion 273 is formed on the upper surface of each of the supporting legs 270, 270' over a predetermined range. The rack portion 273 is engaged with a driving pinion 286, which will be discussed below, so that a power is transmitted.

The supporting legs 270, 270' are driven by the driving pinions 286 and then moved in and out of the base portion 260. The supporting legs 270, 270' move along guide channels 260' formed in the base portion 260. The supporting legs 270, 270' are fully received into the base portion 260 when the pivoting portion 250 is folded onto the upper surface of the base portion 260, and are maximally projected out when the pivoting portion 250 is fully unfolded with respect to the base portion 260.

Power transmitting portions 280 are provided in the base portion 260, wherein the power transmitting portions 280 transmit a rotating force generated by rotating the pivoting portion 250 with respect to the base portion 260 to the supporting legs 270, 270'. For reference, FIG. 12 shows the base portion 260, of which the upper case 261 is removed for convenience.

A driving gear 281 is provided so as to rotate coaxially with a rotational center of each of the connecting members 265. The driving gear 281 is connected and mounted to each of the connecting members 265. The driving gear 281 is engaged with a driven gear 282. The driven gear 282 is provided on a rotating shaft 284, both the ends of which are supported with bearings 283 provided in the base portion 260. The driven gear 282 integrally rotates with the rotating shaft 284.

The rotating shaft 284 is formed with the driving pinion 286 so that they rotate integrally. Thus, the driven gear 282 and the driving pinion 286 rotate in the same direction. The driving pinion 286 is engaged with the rack portion 273 of each of the supporting legs 270, 270'.

The operation of the supporting apparatus according to the third embodiment of the present invention as shown in FIGS. 11 and 12 with the above constitutions will be explained below.

The operation of the supporting apparatus of FIGS. 11 and 12 is shown in FIGS. 13*a* to 13*d* sequentially.

Figure 13A:
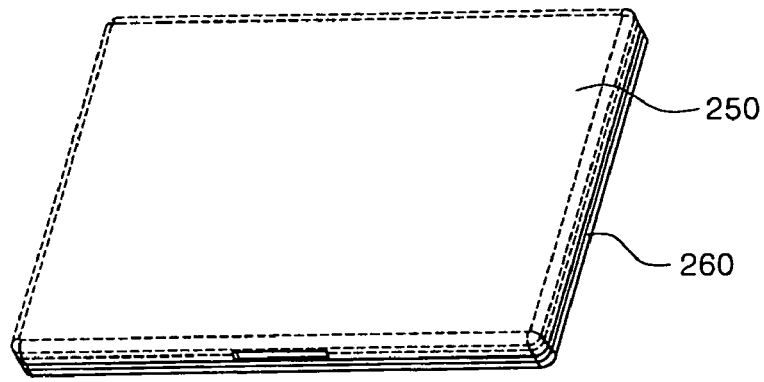
FIGS. 13a, 13b, 13c, and 13d are views showing an operation of the supporting apparatus of FIGS. 11 and 12 according to the third embodiment of the present invention.

When the pivoting portion 250 is folded onto the base portion 260, the supporting legs 270, 270' are fully received in the base portion 260, which is shown in FIG. 13*a*.

If a user applies a force to the pivoting portion 250 in order to pivotally unfold the pivoting portion 250 with respect to the base portion 260, the pivoting portion 250 and therefore the connecting members 265 are rotated. At this time, a rotational direction of the connecting member 265 is denoted by an arrow A in FIG. 12.

Figure 13B:
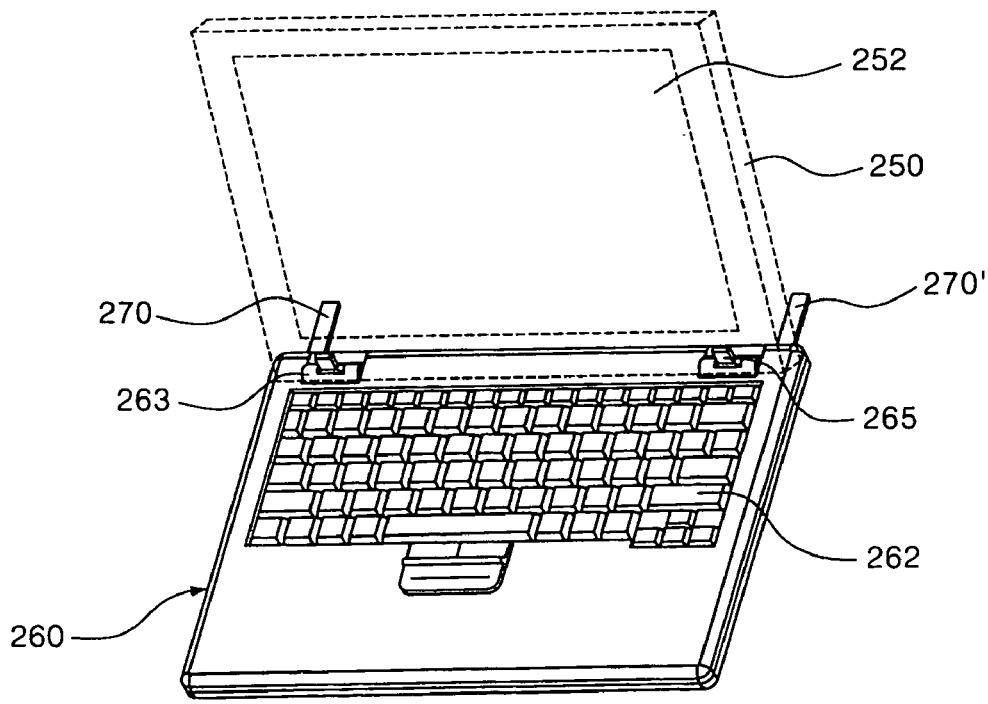

The rotation of the connecting member 265 causes the driving gear 281 to rotate in the same direction, and then the driven gear 282 engaged with the driving gear 281 rotates in the direction opposite to the arrow A. Since the driven gear 282 rotates integrally with the rotating shaft 284, the rotation of the rotating shaft 284 causes the driving pinion 286 to rotate in the same direction. If the driving pinions 286 rotates, the power is transmitted to the rack portions 273 engaged therewith. Thus, the supporting legs 270, 270' move along the guide channels 260', so that the leading ends of the supporting legs 270, 270' are projected out of the base portion 260. FIG. 13*b* shows that the supporting legs 270, 270' are projected out of the base portion 260 at a certain length.

Figure 13C:
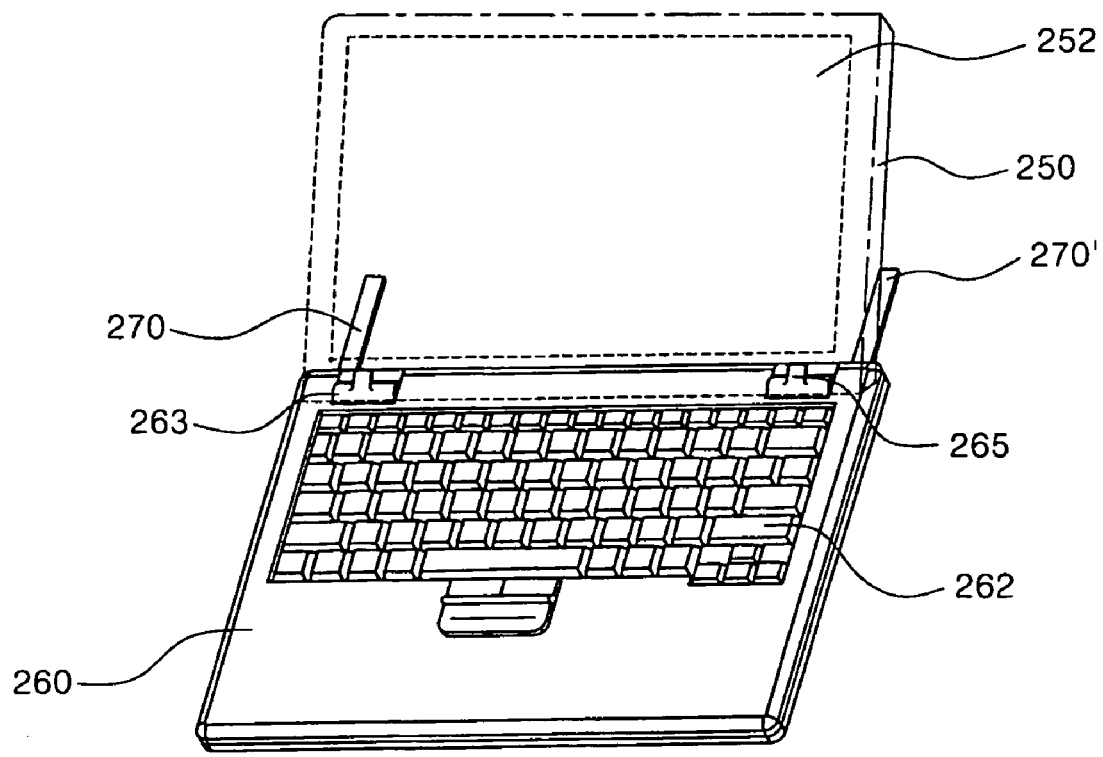

If the user continues to unfold the pivoting portion 250 so that the unfolded angle becomes larger and the pivoting portion 250 is continuously rotated with respect to the base portion 260, the supporting legs 270, 270' are projected further. FIG. 13*c* shows that the supporting legs 270, 270' are projected out further than the supporting legs 270, 270' shown in FIG. 13*b*.

Figure 13D:
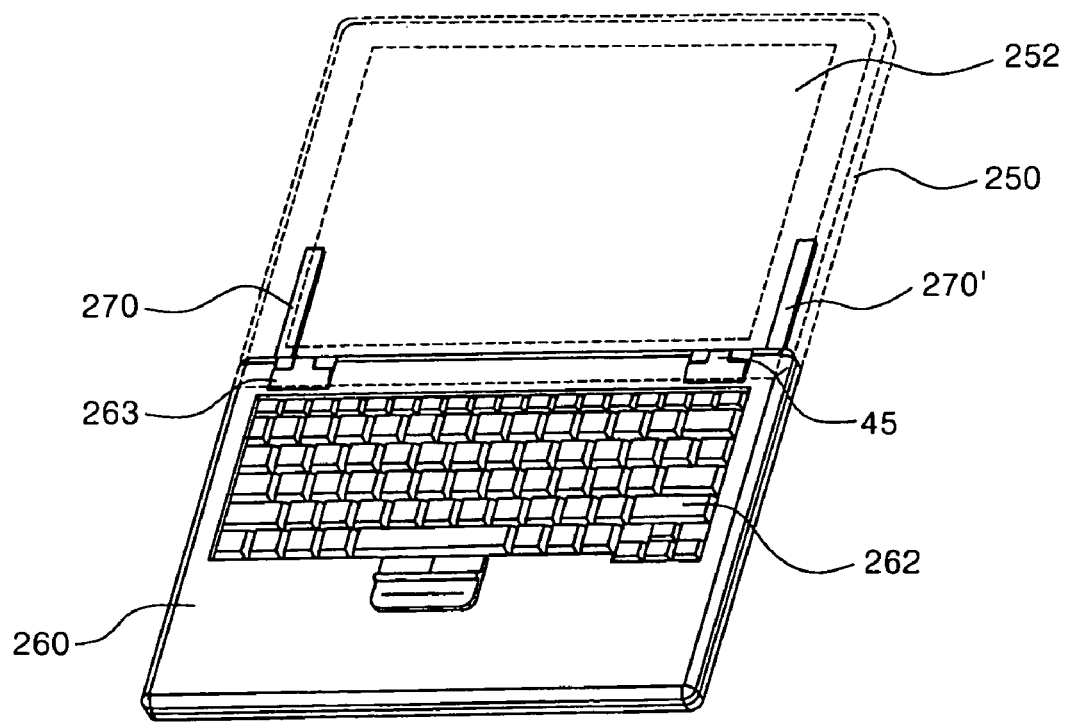

FIG. 13*d* shows that the pivoting portion 250 is maximally unfolded with respect to the base portion 260, when the supporting legs 270, 270' are fully projected out of the base portion 260.

According to this embodiment, the supporting legs 270, 270' are automatically extended out from the base portion 260 when a user begins to unfold the pivoting portion 250. The amount of the supporting legs 270, 270' being extended out is automatically controlled according to or proportional to the amount of unfolding by the pivoting portion 250. The larger the unfolded angle of the pivoting portion 250 with respect to the base portion 260, the further the projected length of the supporting legs 270, 270' from the base portion 260 is. Also, any other schemes which provide such automatic extension of the legs according to a pivoting angle of the pivoting portion may be used. Thus, the whole portable computer is more securely supported. In particular, even though the center of gravity of the whole portable computer may get out of the base portion 260 when the pivoting portion 250 is unfolded, the whole portable computer is always well supported by the supporting legs 270, 270'.

The present invention is not limited to the embodiments described above and is defined by the following claims. It is obvious that various modifications and adaptations can be made without departing from the scope of the claims by those skilled in the art of the present invention.

For example, in the embodiments of the present invention, the pivoting portion may be a tablet computer or a display unit of a notebook computer, and the base portion may be a keyboard for the tablet computer or a main body of the notebook computer.

Furthermore, in the illustrated embodiments, the pivoting portion and the base portion are of the same size or of substantially the same size, but can be of different size. In particular, in the case of the tablet computer, the base portion may be smaller than the pivoting portion. That is the reason why according to the present invention, the tablet computer is supported geometrically by the projection of the supporting leg(s) from the base portion.

The supporting apparatus of the portable computer according to the present invention may have functional effects as follows.

First, the present invention is designed so that the base portion is provided with only necessary parts regardless of the weight or size of the pivoting portion, causing the base portion to be light and compact. Thus, the portable computer also becomes more light and compact.

In addition, according to the present invention, the installation state of the portable computer for use is more stable and a user's convenience is improved.

Furthermore, the supporting leg(s) is automatically projected when the pivoting portion is unfolded with respect to the base portion in the portable computer, which provides convenient use.

Also, the supporting leg(s) for stably supporting the portable computer is projected out only in use according to the unfolded angle of the pivoting portion. Otherwise, the supporting leg(s) is received into the base portion, and thus the appearance of the portable computer is simplified when the portable computer is carried.

What is claimed is:

1. A supporting apparatus for a portable computer, the portable computer including a base part and a pivoting part pivotally coupled to the base part, the apparatus comprising:
   a single support structure separate from the pivoting part having first and second leg parts and a middle part that connects the first and second leg parts, the single support structure projecting outwardly from rear portions of the base part, so as to provide support for a pivoting of the pivoting part; and
   limiting means for limiting a movement of the first and second leg parts toward or away from the rear portions of the base part at certain distance intervals.

2. The portable computer of claim 1, wherein the first and second leg parts are located outside of the base part.

3. The apparatus of claim 1, wherein the support structure further includes:
   an elastic member disposed at an end portion of each of the first and second leg parts.

4. The apparatus of claim 1, wherein the support structure further includes:
   a stopper disposed at each of the side rear portions of the base part; and
   a plurality of stopper holes disposed on each of the first and second leg parts and selectively engaging with the corresponding stopper to limit a movement of the first and second leg parts at certain intervals.

5. The apparatus of claim 4, wherein the support structure further includes:
   at least one locking knob to selectively engage with one of the stopper holes.

6. The portable computer of claim 5, wherein the first and second leg parts are located outside of the base part.

7. A portable computer comprising:
   a base part;
   pivoting part pivotally coupled to the base part;
   a single support structure having first and second leg parts, a middle part separate from the pivoting part connecting the first and second leg parts, and movably projecting from rear portions of the base part, so as to provide support for a pivoting of the pivoting part; and
   limiting means for limiting a movement of the first and second leg parts toward or away from the rear portions of the base part at certain distance intervals.

8. The computer of claim 7, wherein the support structure further includes:
   an elastic member disposed at an end portion of each of the first and second leg parts.

9. The computer of claim 7, wherein the support structure further includes:
   a stopper disposed at each of the side rear portions of the base part; and
   a plurality of stopper holes disposed on each of the first and second leg parts and selectively engaging with the corresponding stopper to limit a movement of the first and second leg parts at certain intervals.

10. The computer of claim 9, wherein the support structure further includes:
    at least one locking knob to selectively engage with one of the stopper holes.

11. The computer of claim 7, wherein the pivoting part is a tablet computer, and the base part is keyboard for the tablet computer.

12. The computer of claim 7, wherein the pivoting part is a display unit of a notebook computer, and the base part is a main body of the notebook computer.

13. A supporting apparatus for a portable computer, the portable computer including a base part and a pivoting part pivotally coupled to the base part, the apparatus comprising:
    a support structure, separate from the pivoting part, having first and second leg parts and a middle part connecting the first and second leg parts, wherein the support structure including the middle part is extendable rearwardly outward from outside rear portions of the base part, so as to provide support for a pivoting of the pivoting part.

14. A portable computer comprising:
    a base part;
    a pivoting part pivotally coupled to the base part; and
    a support structure, separate from the pivoting part, having first and second leg parts and a middle part connecting the first and second leg parts, wherein the support structure including the middle part is extendable rearwardly outward from outside rear portions of the base part, so as to provide support for a pivoting of the pivoting part.

15. A supporting apparatus for a portable computer, the portable computer including a base part having a bottom side and a rear side and a pivoting part pivotally coupled to the base part adjacent to the back side, the apparatus comprising:
    first and second leg parts retractably projecting outwardly from the rear side of the base part substantially parallel to the bottom side of the base part, so as to provide support for a pivoting of the pivoting part; and
    limiting for limiting a movement of the first and second leg parts toward or away from the rear side of the base part and for automatically adjusting a projection amount of the first and second leg parts in accordance with a pivoting angle of the pivoting part.

16. The apparatus of claim 15, wherein the support structure further includes:
    a hinge unit provided in the base part for allowing the pivoting part to rotate with respect to the base part; and
    a power transmitting portion to transmit a rotating force of the pivoting part to the first and second leg parts, whereby the first and second parts are automatically projected out of the base part according to the rotating force of the pivoting part.

17. A portable computer, comprising
    a base part having a bottom side and a rear side and a pivoting part pivotally coupled to the base part adjacent to the back side, a pivoting part pivotably coupled to the base part;

first and second leg parts retractably projecting outwardly from the rear side of the base part substantially parallel to the bottom side of the base part, so as to provide support for a pivoting of the pivoting part; and limiting means for limiting a movement of the first and second leg parts toward or away from the rear side of the base part and for automatically adjusting a projection amount of the first and second leg parts in accordance with a pivoting angle of the pivoting part.

18. The computer of claim 17, wherein the support structure further includes:

a hinge unit provided in the base part for allowing the pivoting part to rotate with respect to the base part; and a power transmitting portion to transmit a rotating force of the pivoting part to the first and second leg parts, whereby the first and second leg parts are automatically projected out of the base part according to the rotating force of the pivoting part.

* * * * *